US012659902B2

(12) United States Patent  
Hu et al.

(10) Patent No.: US 12,659,902 B2  
(45) Date of Patent: Jun. 16, 2026

(54) METHOD AND APPARATUS FOR REPORTING TIMING ADVANCE, AND TERMINAL DEVICE

(71) Applicant: GUANGDONG OPPO MOBILE TELECOMMUNICATIONS CORP., LTD., Dongguan (CN)

(72) Inventors: Yi Hu, Dongguan (CN); Haitao Li, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 331 days.

(21) Appl. No.: 18/233,471

(22) Filed: Aug. 14, 2023

(65) Prior Publication Data

US 2023/0403668 A1 Dec. 14, 2023

Related U.S. Application Data

(63) Continuation of application No. PCT/CN2021/092506, filed on May 8, 2021.

(51) Int. Cl.  
*H04W 56/00* (2009.01)

(52) U.S. Cl.  
CPC .............................. *H04W 56/0055* (2013.01)

(58) Field of Classification Search  
CPC .......... H04W 56/0045; H04W 56/0055; H04B 7/18513  
See application file for complete search history.

(56) References Cited

U.S. PATENT DOCUMENTS

| | | | |
|---|---|---|---|
| 8,743,748 B2 | 6/2014 | Pan | |
| 11,272,561 B2 * | 3/2022 | Wei | H04W 72/23 |
| 12,309,730 B2 * | 5/2025 | Tsai | H04W 56/005 |
| 2011/0051633 A1 | 3/2011 | Pan | |
| 2020/0137821 A1 * | 4/2020 | Cirik | H04B 7/063 |
| 2022/0086780 A1 * | 3/2022 | Tsai | H04W 56/006 |
| 2022/0095258 A1 * | 3/2022 | Yeo | H04W 56/0045 |
| 2022/0240094 A1 * | 7/2022 | Kim | H04W 12/106 |
| 2023/0039127 A1 * | 2/2023 | Shrestha | H04W 74/0841 |
| 2023/0099762 A1 * | 3/2023 | Khoshkholgh Dashtaki | H04W 56/001 370/350 |

(Continued)

FOREIGN PATENT DOCUMENTS

| | | |
|---|---|---|
| CN | 101572577 A | 11/2009 |
| CN | 102083197 A | 6/2011 |
| WO | 2021022442 A1 | 2/2021 |

OTHER PUBLICATIONS

Supplementary European Search Report in the European application No. 21941086.7, mailed on Feb. 27, 2024. 9 pages.

(Continued)

*Primary Examiner* — Bailor C Hsu  
(74) *Attorney, Agent, or Firm* — BAYES PLLC

(57) ABSTRACT

A method and apparatus for reporting timing advance, and a non-transitory computer readable storage medium are provided. The method comprises: a terminal device receives configuration information sent by a network device, the configuration information being used for configuring timing advance (TA) reporting triggered by a plurality of reporting conditions; and the terminal device performs TA reporting based on the configuration information.

16 Claims, 12 Drawing Sheets

A terminal device receives configuration information sent by a network device, and the configuration information configures TA reports triggered by multiple reporting conditions — 801

The terminal device performs TA reporting based on the configuration information — 802

(56) References Cited

U.S. PATENT DOCUMENTS

2023/0164720 A1* 5/2023 Huang .................. H04W 24/10
370/350

OTHER PUBLICATIONS

ETSI MCC: "Report of 3GPP TSG RAN WG2 meeting #113bis-e, Online", 3GPP Draft; Draft_R2-113BIS-E_Meeting_Report_V2, 3rd Genen Parnership Project(3GPP), Mobile Competence Centre; 650, Route Des Lucioles; F-06921 Sophia-Antipolis Cedex; France, No. ; Apr. 12, 2021-Apr. 20, 2021 May 6, 2021 (May 6, 2021), XP052001291, paragraph [8.10]. 279 pages.
Moderator (Ericsson) : "Feature lead summary#3 on timing relationship enhancements", 3GPP Draft; R1-2103914, 3rd Generation Partnership Project (3GPP), Mobile Competence Centre; 650, Route Des Lucioles; F-06921 Sophia-Antipolis Cedex; France, vol. RAN WG1, No. e-Meeting; Apr. 12, 2021-Apr. 20, 2021 Apr. 28, 2021 (Apr. 28, 2021), XP051998282, K_offset update; paragraph [01.1]—paragraph [01.3]. 64 pages.
International Search Report in the international application No. PCT/CN2021/092506, mailed on Jan. 27, 2022. 5 pages with English translation.
Written Opinion of the International Search Authority in the international application No. PCT/CN2021/092506, mailed on Jan. 27, 2022. 8 pages with English translation.
3GPP TSG RAN WG1 #98bis R1-1910387, Chongqing, China, Oct. 14-20, 2019, Agenda Item: 7.2.5.3, Source: OPPO, Title: NTN operation for Doppler and Timing Advance, Document for: Discussion. 4 pages.
3GPP TSG-RAN WG2 Meeting #113bis electronic R2-2104302, Online, Apr. 12-20, 2021, Agenda item: 10.2, Source: Vice Chairman (ZTE Corporation), Title: Report from Break-out session on R17 NTN and REDCAP, Document for: Approval. 35 pages.

* cited by examiner

100

1202

1201

1203

Satellite

Feeder link

Service
link

Gateway

Data
network

A terminal device receives configuration information sent by a network device, and the configuration information configures TA reports triggered by multiple reporting conditions

801

The terminal device performs TA reporting based on the configuration information

802

METHOD AND APPARATUS FOR REPORTING TIMING ADVANCE, AND TERMINAL DEVICE

CROSS-REFERENCE TO RELATED APPLICATION

This application is a continuation of International Application No. PCT/CN2021/092506 filed on May 8, 2021, the disclosure of which is incorporated herein by reference in its entirety.

BACKGROUND

The 3rd Generation Partnership Project (3GPP) is researching the technology of Non Terrestrial Network (NTN), which generally provides communication services to terrestrial users by means of satellite communications.

In an NTN system, a timing offset is introduced to enhance timing of uplink transmission. A terminal device may assist a network device to configure the timing offset by reporting timing advance (TA). It is required to clarify how the terminal device triggers and performs TA reporting.

SUMMARY

Embodiments of the present disclosure relate to the technical field of mobile communications, and provide a method and device for reporting timing advance, and a terminal device.

The embodiments of the present disclosure provide a method for reporting timing advance, which includes the following operations.

A terminal device receives configuration information sent by a network device. The configuration information configures TA reports triggered by multiple reporting conditions.

The terminal device performs TA reporting based on the configuration information.

The embodiments of the present disclosure provide a device for reporting timing advance, which is applicable to a terminal device. The device includes a receiving unit and a reporting unit.

The receiving unit is configured to receive configuration information sent by a network device. The configuration information configures TA reports triggered by multiple reporting conditions.

The reporting unit is configured to perform TA reporting based on the configuration information.

The embodiments of the present disclosure provide a terminal device, which includes a processor and a memory. The memory is configured to store a computer program, and the processor is configured to call and run the computer program stored in the memory to execute the method for reporting timing advance described above.

The embodiments of the present disclosure provide a chip, which is used to implement the method for reporting timing advance described above.

Specifically, the chip includes a processor. The processor is configured to call a computer program from a memory and run the computer program, to cause a device mounted with the chip to execute the method for reporting timing advance described above.

The embodiments of the present disclosure provide a computer readable storage medium. The computer readable storage medium is used to store a computer program that causes a computer to execute the method for reporting timing advance described above.

The embodiments of the present disclosure provide a computer program product, which includes computer program instructions that cause a computer to execute the method for reporting timing advance described above.

The embodiments of the present disclosure provide a computer program. The computer program, when running on a computer, causes the computer to execute the method for reporting timing advance described above.

According to the above technical solutions, the network device configures the TA reports triggered by the multiple reporting conditions for the terminal device. In this case, it is clarified how the terminal device performs TA reporting, thereby enabling the terminal device to provide an effective reference for scheduling of the network device through the TA reports.

BRIEF DESCRIPTION OF THE DRAWINGS

The drawings described herein are intended to provide a further understanding of the present disclosure and form a part of the present disclosure. The schematic embodiments of the present disclosure and the description thereof are intended to explain the present disclosure and do not constitute an improper limitation of the present disclosure. In the drawings.

DETAILED DESCRIPTION

The technical solutions in the embodiments of the disclosure will be described below in combination with the drawings in the embodiments of the disclosure. It is apparent that the described embodiments are not all embodiments but part of embodiments of the disclosure. All other embodiments obtained by those of ordinary skill in the art based on the embodiments in the disclosure without creative work shall fall within the scope of protection of the present disclosure.

Figure 1:
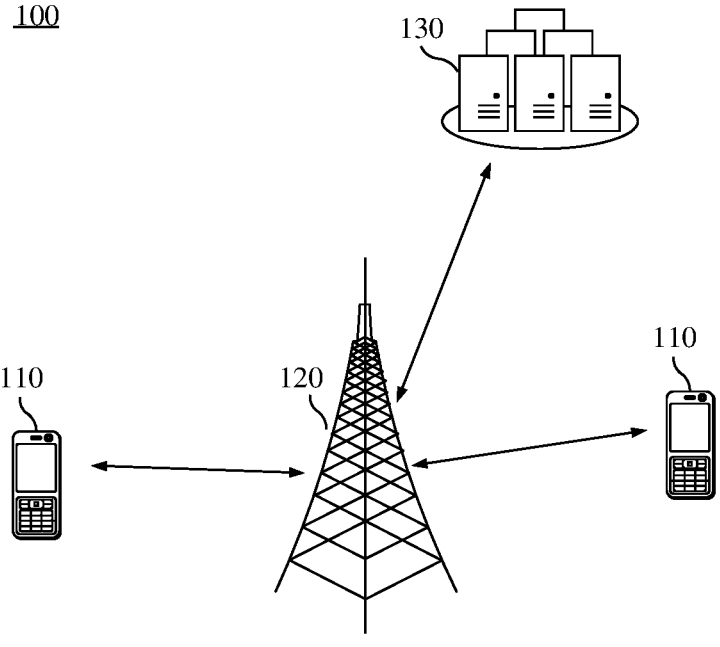
FIG. 1 is a schematic diagram of an application scenario of an embodiment of the present disclosure.

FIG. 1 is a schematic diagram of an application scenario of an embodiment of the present disclosure.

As illustrated in FIG. 1, a communication system 100 may include a terminal device 110 and a network device 120. The network device 120 may communicate with the terminal device 110 through an air interface. Multi-service transmissions are supported between the terminal device 110 and the network device 120.

It is to be understood that the embodiments of the present disclosure are described by taking the communication system 100 as an example, which is not limited to the embodiments of the disclosure. That is, the technical solutions of the embodiments of the present disclosure may be applied to various communication systems, such as a Long Term Evolution (LTE) system, LTE Time Division Duplex (TDD), a Universal Mobile Telecommunications System (UMTS), an Internet of Things (IoT) system, a Narrow Band Internet of Things (NB-IoT) system, an enhanced Machine-Type Communications (eMTC) system, a 5G communication system (also referred to a New Radio (NR) communication system), a future communication system or the like.

In the communication system 100 illustrated in FIG. 1, the network device 120 may be an access network device that communicates with the terminal device 110. The access network device may provide communication coverage for a specific geographic area and may communicate with the terminal device 110 (e.g., user equipment (UE)) located within the coverage area.

The network device 120 may be an Evolutional Node B (eNB or eNodeB) in the LTE system, or a Next Generation Radio Access Network (NG RAN) device, or a gNB in an NR system or a wireless controller in a Cloud Radio Access Network (CRAN), or the network device 120 may be a relay station, an access point, a vehicle-mounted device, a wearable device, a hub, a switch, a bridge, a router, or a network device in a future evolved Public Land Mobile Network (PLMN) device or the like.

The terminal device 110 may be any terminal device, which includes but is not limited to a terminal device that is connected with the network device 120 or another terminal device via a wired or wireless connection.

For example, the terminal device 110 may be referred to an access terminal, a UE, a subscriber unit, a subscriber station, a mobile station, a mobile radio station, a remote station, a remote terminal, a mobile device, a user terminal, a terminal, a wireless communication device, a user agent or a user device. The access terminal may be a cellular telephone, a cordless telephone, a Session Initiation Protocol (SIP) telephone, an IoT device, a satellite handheld terminal, a Wireless Local Loop (WLL) station, a Personal Digital Assistant (PDA), a handheld device with a wireless communication function, a computing device or other processing device connected to a wireless modem, a vehicle-mounted device, a wearable device, a terminal device in a 5G network, a terminal device in a future evolved network or the like.

The terminal device 110 may be applied for Device to Device (D2D) communication.

The wireless communication system 100 may also include a core network device 130 that communicates with the base station, which may be a 5G Core (5GC) device, for example, an Access and Mobility Management Function (AMF), for another example, an Authentication Server Function (AUSF), for another example, a User Plane Function (UPF), and for another example, a Session Management Function (SMF). In one example, the core network device 130 may also be an Evolved Packet Core (EPC) device of the LTE network, for example, a Session Management Function+Core Packet Gateway (SMF+PGW−C) device. It is to be understood that the SMF+PGW−C may simultaneously realize the same functions as the SMF and the PGW−C. In the process of network evolution, the core network device may also be called other names or form a new network entity by dividing the functions of the core network, which is not limited in the embodiments of the present disclosure.

The various functional units in the communication system 100 may also communicate with each other by establishing connections via the next generation network (NG) interface.

For example, the terminal device establishes an air interface connection with the access network device through an NR interface for transmission of user plane data and control plane signaling. The terminal device may establish a control-plane signaling connection to the AMF via an NG interface 1 (abbreviated as N1). The access network device, such as a gNB, may establish a user-plane data connection to the UPF via an NG interface 3 (abbreviated as N3). The access network device may establish a control-plane signaling connection to the AMF via an NG interface 2 (abbreviated as N2). The UPF may establish a control-plane signaling connection to the SMF via an NG interface 4 (abbreviated as N4). The UPF may interact with the data network for user-plane data via an NG interface 6 (abbreviated as N6). The AMF may establish a control-plane signaling connection to the SMF via an NG interface 11 (abbreviated as N11). The SMF may establish a control plane signaling connection with the PCF via an NG interface 7 (abbreviated as N7).

FIG. 1 exemplarily illustrates a base station, a core network device and two terminal devices. In one example, the wireless communication system 100 may include multiple base station devices, and other numbers of terminal devices may be included within the coverage area of each base station, which is not limited in the embodiments of the present disclosure.

The 3GPP is researching the technology of Non Terrestrial Network (NTN), which generally provides communication services to terrestrial users by means of satellite communication. Compared with terrestrial cellular network communication, the satellite communication has many unique advantages. Firstly, the satellite communication is not limited by the user's geographic region. For example, general land communication cannot cover areas where the communication device cannot be set up, such as oceans, mountains, deserts or the like, or areas where communication coverage cannot be done due to sparse population. However, for the satellite communication, because a single satellite can cover a large ground and the satellite can orbit around the earth, theoretically, every corner of the earth can be covered by the satellite communication. Secondly, the satellite communication has a great social value. The satellite communication can cover remote mountainous areas, poor and backward countries or regions\at a lower cost, so that people in these areas can enjoy the advanced voice communications and the mobile Internet technology, which facilitates to reduce the digital divide with the developed areas and promote the development of these areas. Thirdly, the satellite communication distance is long, and the communication cost does not increase significantly with the increase of communication distance. Finally, the satellite communication has a high stability and is not limited by natural disasters.

The NTN technology may be combined with various communication systems. For example, the NTN technology may be combined with the NR system to form an NR-NTN system. For another example, the NTN technology may be combined with the IoT system to form an IoT-NTN system. By way of an example, the IoT-NTN system may include an NB-IoT-NTN system and an eMTC-NTN system.

Figure 2:
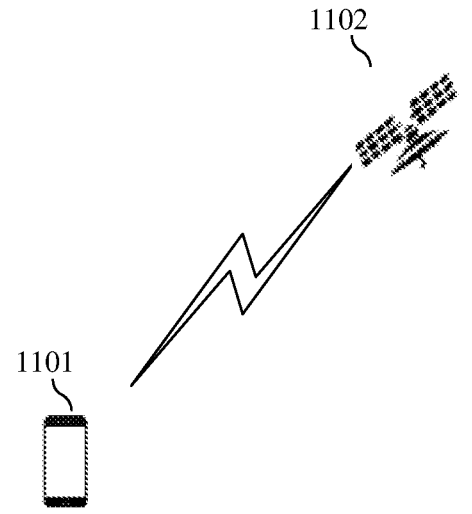
FIG. 2 is a schematic architectural diagram of another communication system according to an embodiment of the present disclosure.

FIG. 2 is a schematic architectural diagram of another communication system according to an embodiment of the present disclosure.

As illustrated in FIG. 2, the communication system includes a terminal device 1101 and a satellite 1102. A wireless communication may be performed between the terminal device 1101 and the satellite 1102. A network formed between the terminal device 1101 and the satellite 1102 may also be referred to as the NTN. In the architecture of the communication system illustrated in FIG. 2, the satellite 1102 may have a base station function, and the terminal device 1101 and the satellite 1102 may communicate with each other directly. Under the system architecture, the satellite 1102 may be referred to as a network device. In some embodiments of the present disclosure, the communication system may include multiple network devices 1102, and other numbers of terminal devices may be included within the coverage of each network device 1102, which is not limited by the embodiments of the present disclosure.

Figure 3:
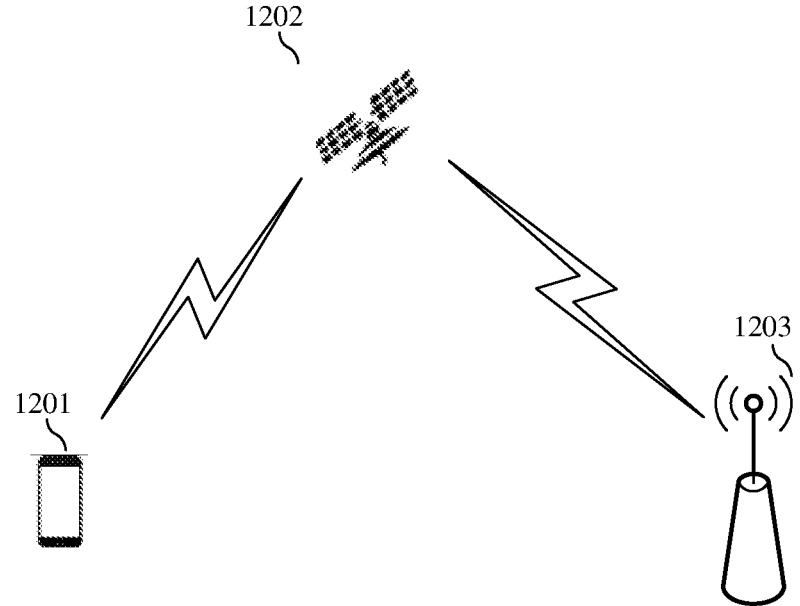
FIG. 3 is a schematic architectural diagram of another communication system according to an embodiment of the present disclosure.

FIG. 3 is a schematic architectural diagram of another communication system according to an embodiment of the present disclosure.

As illustrated in FIG. 3, the communication system includes a terminal device 1201, a satellite 1202 and a base station 1203. A wireless communication may be performed between the terminal device 1201 and the satellite 1202, and a communication may be performed between the satellite 1202 and the base station 1203. A network formed among the terminal device 1201, the satellite 1202 and the base station 1203 may also be referred to as the NTN. In the architecture of the communication system illustrated in FIG. 3, the satellite 1202 may not have a base station function, and the communication between the terminal device 1201 and the base station 1203 are required to relay through the satellite 1202. Under the system architecture, the base station 1203 may be referred to as a network device. In some embodiments of the present disclosure, the communication system may include multiple network devices 1203, and other numbers of terminal devices may be included within the coverage of each network device 1203, which is not limited by the embodiments of the present disclosure. The network device 1203 may be the network device 120 in FIG. 1.

It is to be understood that the satellite 1102 or the satellite 1202 mentioned above includes, but is not limited to, a Low-Earth Orbit (LEO) satellites, a Medium-Earth Orbit (MEO) satellite, a Geostationary Earth Orbit (GEO) satellite, a High Elliptical Orbit (HEO) satellite and so on. The satellites may cover the ground with multiple beams. For example, one satellite may form dozens or even hundreds of beams to cover the ground. In other words, a satellite beam may cover the ground area with a diameter of tens to hundreds of kilometers, so as to ensure the coverage of satellites and improve the system capacity of the entire satellite communication system.

As an example, an altitude range of the LEO satellite may be 500 km~1500 km, a corresponding orbital period may be about 1.5 hours~2 hours, a signal propagation delay of single-hop communication between users may generally be less than 20 milliseconds, a maximum satellite visual time may be 20 minutes, and the LEO satellite has a short signal propagation distance and a low link loss, which requires low transmission power of the user terminal. An orbital altitude of the GEO satellite may be 35786 km, a rotation period around the earth may be 24 hours, and a signal propagation delay of single-hop communication between users may generally be 250 milliseconds.

In order to ensure the coverage of the satellite and improve the system capacity of the entire satellite communication system, the satellite covers the ground with multiple beams. One satellite may form dozens or even hundreds of beams to cover the ground; and one satellite beam may cover the ground area with a diameter of tens to hundreds of kilometers.

It is to be noted that FIG. 1 to FIG. 3 only illustrate the systems to which the present disclosure applies exemplarily, and of course, the method illustrated in the embodiments of the present disclosure may also be applied to other systems. In addition, terms "system" and "network" herein may usually be exchanged. In the disclosure, the term "and/or" herein is only an association relationship describing associated objects and represents that three relationships may exist. For example, A and/or B may represent three conditions: i.e., independent existence of A, existence of both A and B, and independent existence of B. In addition, character "/" herein usually represents that previous and next associated objects form an "or" relationship. It is also to be understood that "indication" mentioned in the embodiments of the present disclosure may be a direct indication, may also be an indirect indication and may also be a representation of an association relationship. For example, A indicates B, which may represent that A directly indicates B (for example, B may be obtained through A), may also represent that A indirectly indicates B (for example, A indicates C, and B may be obtained by C), and may also represent that there is an association relationship between A and B. It is also to be understood that "correspondence" mentioned in the embodiments of the present disclosure may represent that there is a direct or indirect correspondence relationship between the two elements, may also represent that there is an association relationship between the two elements, may also be a relationship between indication and being indicated, configuration and being configured and so on. It is also to be understood that the "predefined" or "predefined rules" mentioned in the embodiments of the present disclosure may be implemented by pre-storing corresponding codes, tables, or other manners for indicating relevant information in devices (e.g., including the terminal device and the network device), the specific implementation of which is not limited by the present disclosure. For example, "predefined" may refer to those defined in a protocol. It is also to be understood that, in the embodiments of the present disclosure, "protocol" may refer to a standard protocol in the field of communication, which may include, for example, a LTE protocol, NR protocol and relevant protocol applied in the future communication system, which is not limited in the present disclosure.

The satellites may be divided into two types according to the functions, i.e., transparent payload and regenerative payload. The transparent payload satellite only provides functions of radio frequency filtering, frequency conversion and amplification, and only provides the transparent forwarding of signals without changing waveform signals forwarded by the transparent payload satellite. The regenerative payload satellite, in addition to providing the functions of radio frequency filtering, frequency conversion and amplification, also provides functions of demodulation/decoding, routing/conversion and coding/modulation, which has some or all functions of the base station.

In the NTN, one or more Gateways may be included for communication between the satellites and the terminal.

Figure 4:
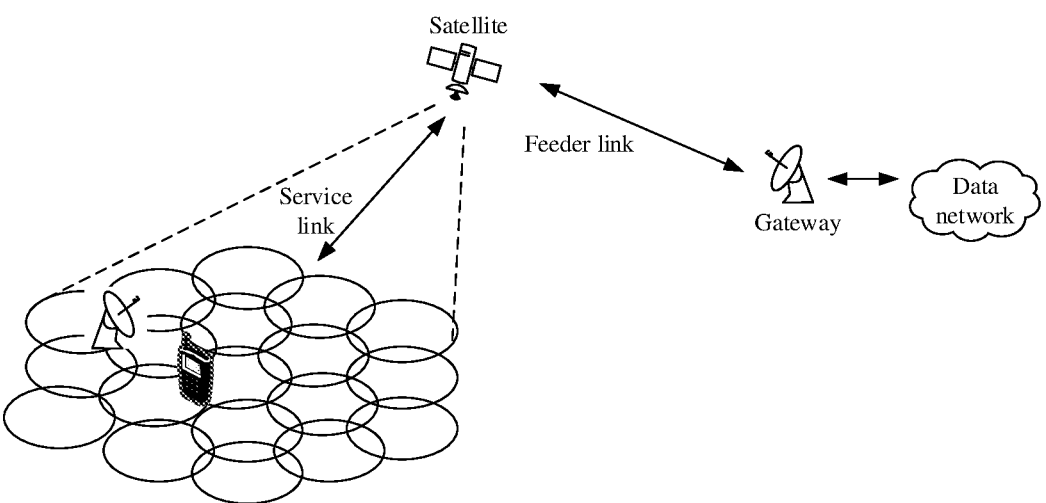
FIG. 4 is a schematic diagram of a transparent payload satellite-based NTN scenario according to an embodiment of the present disclosure.
Figure 5:
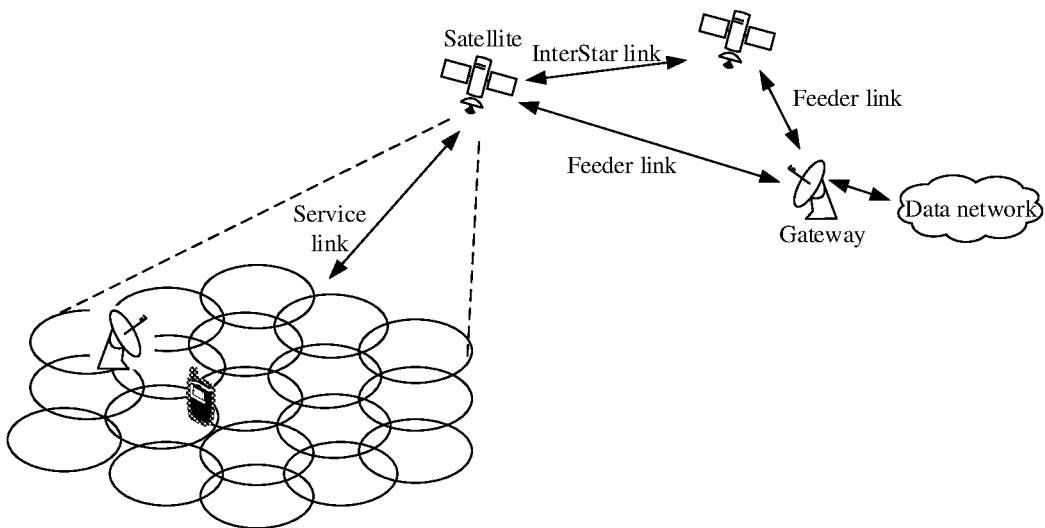
FIG. 5 is a schematic diagram of a regenerative payload satellite-based NTN scenario according to an embodiment of the present disclosure.

FIG. 4 and FIG. 5 illustrate schematic diagrams of a transparent payload satellite-based NTN scenario and a regenerative payload satellite-based NTN scenario, respectively.

As illustrated in FIG. 4, for the transparent payload satellite-based NTN scenario, the gateway and the satellite communicate with each other through the feeder link, and the satellite and the terminal may communicate with each other through the service link. As illustrated in FIG. 5, for the regenerative payload satellite-based NTN scenario, the satellites communicate with each other through the InterStar link, the gateway and the satellite communicate with each other through the Feeder link, and the satellite and the terminal communicate with each other through the service link.

In order to facilitate understanding of the technical solutions of the embodiments of the present disclosure, the relevant technologies of the embodiments of the present disclosure are described as follows. The following relevant technologies as optional solutions may be arbitrarily combined with the technical solutions of the embodiments of the present disclosure, all of which fall within the scope of protection of the embodiments of the present disclosure.

Timing Relationship of the NTN System

In the terrestrial communication system, a propagation delay of signal communication is usually less than 1 millisecond. In the NTN system, because of the long communication distance between the terminal device and the satellite (or the network device), the propagation delay of signal communication is very large and ranges from tens of milliseconds to hundreds of milliseconds, which is specifically related to the satellite orbit altitude and the service type of satellite communications. In order to deal with the large propagation delay, the timing relationship of the IoT-NTN system is required to be enhanced compared with the IoT system.

In the NTN system, the terminal device needs to consider the influence of TA during performing the uplink transmission. Because of the large propagation delay in the system, the TA value also has a large range. When the terminal device is scheduled to perform uplink transmission in a subframe n, the terminal device transmits in advance during the uplink transmission in consideration of the round trip propagation delay, so that the signal may be in the uplink subframe n of the network device side uplink when reaching the network device side. Specifically, the timing relationship in the NTN system may include two cases, as illustrated in FIG. 6 and FIG. 7, respectively.

Figure 6:
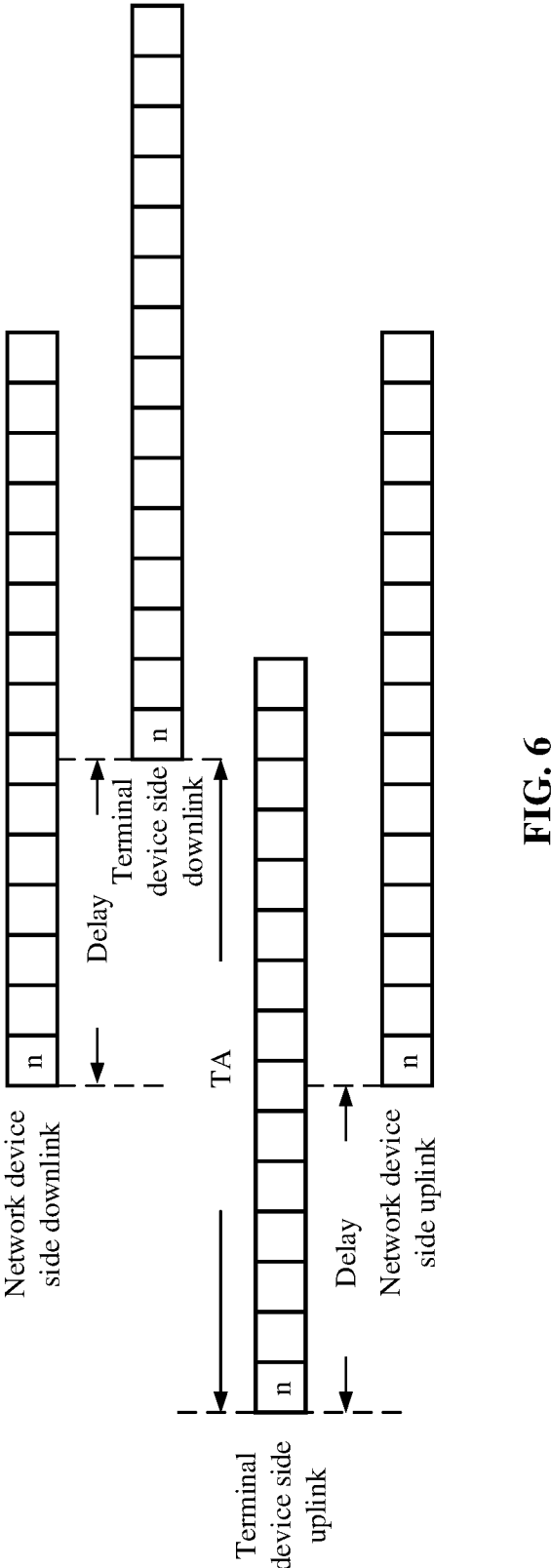
FIG. 6 is a first schematic diagram of a timing relationship of an NTN system according to an embodiment of the present disclosure.

Case 1: as illustrated in FIG. 6, the downlink subframe and the uplink subframe at the network device side are aligned. Accordingly, in order to enable the uplink transmission of the terminal device to be aligned with the uplink subframe of the network device side when the uplink transmission of the terminal device arrives at the network device side, the terminal device needs to use a larger TA value. In some cases, the TA value corresponds to a timing offset Koffset. In other cases, a Round Trip Time (RTT) of the terminal device corresponds to the timing offset Koffset.

Figure 7:
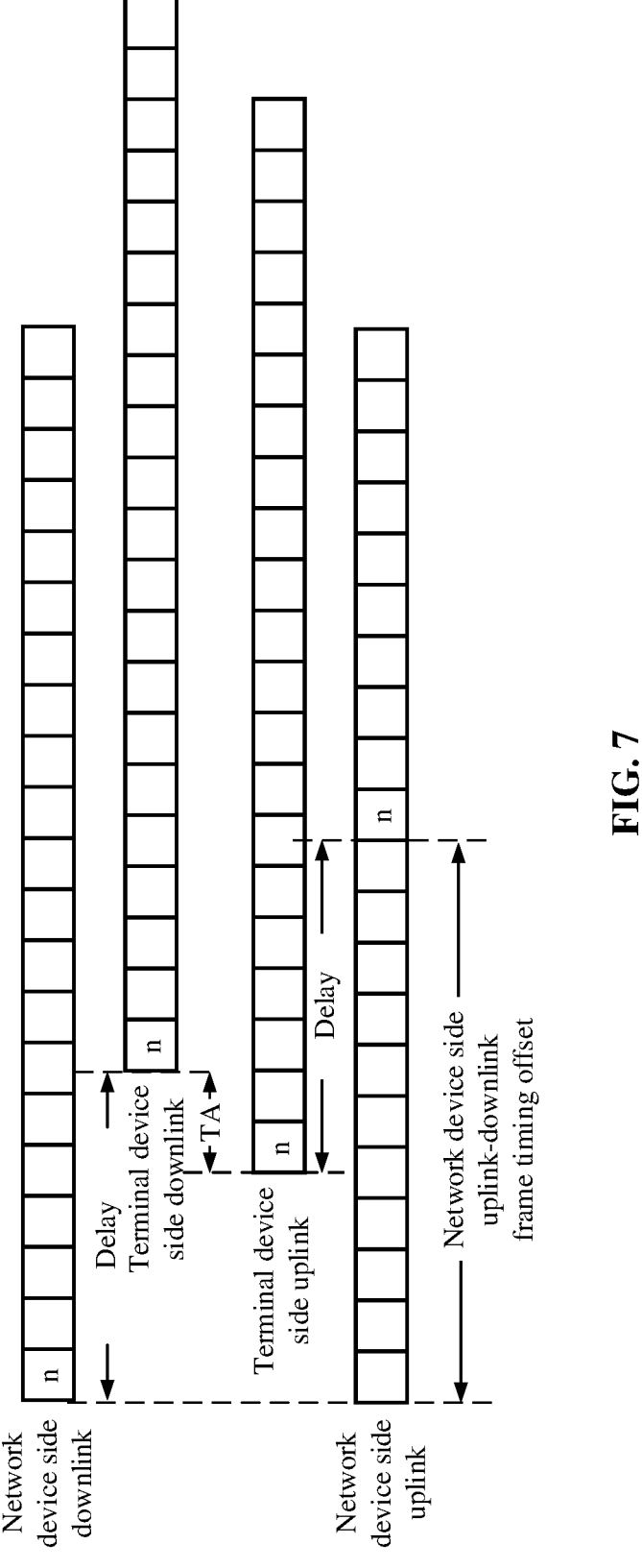
FIG. 7 is a second schematic diagram of a timing relationship of an NTN system according to an embodiment of the present disclosure.

Case 2: as illustrated in FIG. 7, there is an offset between the downlink subframe and the uplink subframe of the network device side. In this case, in order to enable the uplink transmission of the terminal device to be aligned with the uplink subframe of the network device side when the uplink transmission of the terminal device arrives at the network device side, the terminal device only needs to use a smaller TA value. In some cases, the TA value corresponds to the timing offset Koffset.

Timing Relationship of the NR System

The timing relationship in the NR system is described as follows:

Physical Downlink Shared Channel (PDSCH) reception timing: when the terminal device is scheduled to receive the PDSCH by Downlink Control Information (DCI), the DCI includes indication information of $K_0$, and the $K_0$ is used to determine a slot for transmitting the PDSCH. For example, if the scheduled DCI is received on the slot n, the slot allocated for PDSCH transmission is a slot where $$\left\lfloor n \cdot \frac{2^{\mu_{PDSCH}}}{2^{\mu_{PDCCH}}} \right\rfloor + K_0,$$

$K_0$ is determined according a subcarrier interval of the PDSCH, and $\mu_{PDSCH}$ and $\mu_{PPCCH}$ are used to determine subcarrier intervals configured for the PDSCH and Physical Downlink Control Channel (PDCCH), respectively. The value range of $K_0$ is 0 to 32.

Timing of DCI-scheduled Physical Uplink Shared Channel (PUSCH) transmission: when the terminal device is scheduled to send the PUSCH by DCI, the DCI includes indication information of $K_2$, and the $K_2$ is used to determine a slot for transmitting the PUSCH. For example, if the scheduled DCI is received on the slot n, the slot allocated for PUSCH transmission is a slot $$\left\lfloor n \cdot \frac{2^{\mu_{PUSCH}}}{2^{\mu_{PDCCH}}} \right\rfloor + K_2,$$

where $K_2$ is determined according to a subcarrier interval of the PDSCH, and $\mu_{PUSCH}$ and $\mu_{PPCCH}$ are used to determine subcarrier intervals configured for the PUSCH and the PDCCH, respectively. The value range of $K_2$ is 0 to 32.

Timing of Random Access Response (RAR) grant-scheduled PUSCH transmission: for a slot scheduled by the RAR grant for PUSCH transmission, if, after the terminal device initiates Physical Random Access Channel (PRACH) transmission, an end position of the PDSCH including the corresponding RAR grant message received by the terminal device is the slot n, the terminal device transmits the PUSCH on the slot $n+K_2+\Delta$, where $K_2$ and $\Delta$ are predefined by protocol.

Transmission timing of Hybrid Automatic Repeat request-ACK (HARQ-ACK) transmission on Physical Uplink Control Channel (PUCCH): for a slot of PUCCH transmission, if an end position of a PDSCH reception is the slot n or an end position of a PDCCH reception indicating Semi-Persistent Scheduling (SPS) PDSCH release is the slot n, the terminal device shall transmit the corresponding HARQ-ACK information on the PUCCH resources within the slot n+K$_1$, where K$_1$ is the number of slots, and K$_1$ is indicated by an information field PDSCH-to-HARQ-timing-indicator in DCI format, or provided through a parameter dl-DataToUL-ACK. K$_1$=0 corresponds to that a last slot of the PUCCH transmission overlaps with a slot of the PDSCH reception or a slot of the PDCCH reception indicating the SPS PDSCH release.

Media Access Control (MAC) Control Element (CE) activation timing: when HARQ-ACK information corresponding to the PDSCH including MAC CE command is transmitted on the slot n, corresponding behavior indicated by the MAC CE command and downlink configuration assumed by the terminal device should be available from the first slot after the slot $$n + 3N_{slot}^{subframe,\mu},$$

where $$N_{slot}^{subframe,\mu}$$

represents the number of slots included in each subframe under the subcarrier interval configuration μ.

Channel State Information (CSI) transmission timing on PUSCH: the transmission timing of the CSI on the PUSCH is the same as that of DCI-scheduled PUSCH transmission in general.

CSI reference resource timing: the CSI reference resource for reporting CSI on an uplink slot n' is determined according to a single downlink slot $$n - n_{CSI\_ref}, \text{ where } n = \left\lfloor n' \cdot \frac{2^{\mu_{DL}}}{2^{\mu_{UL}}} \right\rfloor,$$

μ$_{DL}$ and μ$_{UL}$ are subcarrier intervals configurations for downlink and uplink, respectively. n$_{CSI\_ref}$ depends on the type of CSI reporting.

Aperiodic Sounding Reference Signal (SRS) transmission timing: if the terminal device receives DCI on the slot n to trigger aperiodic SRS transmission, the terminal device transmits the aperiodic SRS in each triggered SRS resource set on the slot $$\left\lfloor n \cdot 2^{\frac{\mu_{SRS}}{\mu_{PDCCH}}} \right\rfloor + k,$$

where k is configured by a high-level parameter slotOffset in each triggered SRS resource set and determined according to a subcarrier interval corresponding to the triggered SRS transmission, and μ$_{SRS}$ and μ$_{PDCCH}$ are subcarrier interval configurations of the triggered SRS transmission and the PDCCH carrying the trigger command, respectively.

Timing Enhancement of the NTN System

The PDSCH reception timing in the NR system is only affected by timing of a downlink receiving side, and is not affected by the large transmission round trip delay in the NTN system. Therefore, the NTN system may reuse the PDSCH reception timing in the NR system.

For other timing affected by an interaction between downlink reception and uplink transmission, in order to work normally in the NTN system or to overcome the large transmission delay in the NTN system, the timing relationship needs to be enhanced. A simple scheme is to introduce an offset parameter into the system, namely the timing offset Koffset, and apply the parameter to the related timing relationship.

DCI-scheduled PUSCH (including CSI transmitted on the PUSCH) transmission timing: if the scheduled DCI is received on the slot n, the slot allocated for PUSCH transmission is a slot $$\left\lfloor n \cdot \frac{2^{\mu_{PUSCH}}}{2^{\mu_{PDCCH}}} \right\rfloor + K_2 + K_{offset}.$$

RAR grant-scheduled PUSCH transmission timing: for a slot scheduled by the RAR grant for PUSCH transmission, the terminal device transmits the PUSCH on the slot n+K$_2$+Δ+K$_{offset}$.

Transmission timing of HARQ-ACK transmission on PUCCH: for a slot of PUCCH transmission, the terminal device shall transmit corresponding HARQ-ACK information on PUCCH resources within the slot n+K$_1$+K$_{offset}$.

MAC CE activation timing: when HARQ-ACK information corresponding to the PDSCH including the MAC CE command is transmitted on the slot n, corresponding behavior indicated by the MAC CE command and downlink configuration assumed by the terminal device should be available from the first slot after the slot $$n + XN_{slot}^{subframe,\mu} + K_{offset},$$

where X may be determined by the capability of the terminal device in the NTN, and a value of X may not be 3.

CSI reference resource timing: the CSI reference resource for reporting CSI on an uplink slot n' is determined according to a single downlink slot n−n$_{CSI_{ref}}$−K$_{offset}$.

Aperiodic SRS transmission timing: if the terminal device receives DCI on the slot n to trigger aperiodic SRS transmission, the terminal device transmits the aperiodic SRS in each triggered SRS resource set on the slot $$\left\lfloor n \cdot 2^{\frac{\mu_{SRS}}{\mu_{PDCCH}}} \right\rfloor + k + K_{offset}.$$

Logical Channel Priority

Like the LTE, in the NR, the network allocates uplink transmission resources based on per-UE instead of per-bearer, and the terminal device determines which radio bearer data may be put into the allocated uplink transmission resources for transmission.

Based on uplink transmission resources configured by the network, the terminal device needs to determine the amount of data transmitted on each logical channel in an initial transmission MAC PDU, and in some cases, the terminal device also allocates resources for the MAC CE. In order to realize multiplexing of uplink logical channels, it is necessary to assign a priority to each uplink logical channel, that is, Logical Channel Priority (LCP). For a MAC PDU with a given size, when multiple uplink logical channels have data transmission requirements simultaneously, resources of the MAC PDU are sequentially allocated in order of logical channel priority corresponding to each uplink logical channel from high to low. At the same time, in order to take into account the fairness between different logical channels, Prioritized Bit Rate (PBR) is introduced. When the terminal device performs logical channel multiplexing, it is necessary to ensure the minimum data rate requirement of each logical channel first, so as to avoid the situation that other uplink logical channels with a low priority of the terminal device are "starved" because the uplink logical channel with a high priority always occupies the uplink resources allocated to the terminal device by the network.

In order to realize the multiplexing of uplink logical channels, the network configures the following parameters for each uplink logical channel through Radio Access Control (RRC):

logical channel priority: the smaller the value of priority, the higher the corresponding priority;

PBR: prioritized Bit Rate, indicating the minimum rate that the logical channel needs to ensure; and BSD (bucketSizeDuration): determining the depth of the token bucket.

The MAC of the terminal device uses the token bucket mechanism to realize the multiplexing of uplink logical channels. The terminal device maintains a variable Bj for each uplink logical channel j, and this variable indicates the number of tokens currently available in the token bucket. The method is described as follows.

1) When the terminal device establishes a logical channel j, Bj is initialized to 0.

2) The terminal device increases the Bj by PBR*T before each LCP process, where T is a time interval from a time when Bj was increased last to a current time.

3) If the Bj updated according to step 2) is greater than the maximum capacity of the token bucket (i.e., PBR*BSD), the Bj is set to the maximum capacity of the token bucket.

When the terminal device receives an UL grant indicating a new transmission, the terminal device performs logical channel priority processing according to the following operations.

Operation 1: for all logical channels with Bj>0, resources are allocated according to the order of priority from high to low, and the resources allocated by each logical channel may only meet the requirements of PBR, that is, the resources are allocated for the logical channel according to the number of tokens in a PBR token bucket corresponding to the logical channel. When PBR of a certain logical channel is set to infinity, logical channels with a lower priority may be considered only when the resources of the logical channel are met.

Operation 2: the size of all MAC SDUs of the logical channel j multiplexed into the MAC PDU in the operation 1 is subtracted from Bj.

Operation 3: if there are remaining uplink resources after the operations 1 and 2 are performed, the remaining resources are allocated to each logical channel in order of logical channel priority from high to low, regardless of the size of Bj. Only when data of the logical channel with a high priority has been sent and the UL grant has not been exhausted, the logical channel with a low priority can be served. That is, in such case, the terminal device maximizes the data transmission of the logical channel with the high priority.

At the same time, the terminal device also follows the following principles.

(1) If the entire RLC SDU can fill in the remaining resources, the RLC SDU should not be segmented.

(2) If the terminal device segments the RLC SDU in the logical channel, the maximum segment should be filled according to the size of the remaining resources.

(3) The terminal device should maximize data transmission.

(4) If the size of the UL grant is greater than or equal to 8 bytes and the terminal device has a requirement for data transmission, the terminal device cannot send padding BSR only or padding only.

For different signals and/or logical channels, the terminal device also needs to follow the following priority order (arranged in descending order of priority) when performing logical channel priority processing:

C-RNTI MAC CE or data from UL-CCCH;

Configured Grant Confirmation MAC CE or BFR MAC CE or Multiple Entry Configured Grant Confirmation MAC CE;

Side link configuration grant confirmation MAC CE;

listen before talking (LBT) failure MAC CE;

prioritized SL-BSR MAC CE;

BSR MAC CE other than that for padding BSR;

Single Entry PHR MAC CE or Multiple Entry PHR MAC CE;

MAC CE for the number of Desired Guard Symbols;

MAC CE for Pre-emptive BSR;

SL-BSR MAC CE other than prioritized SL-BSR MAC CE and SL-BSR MAC CE for padding;

Data from any logical channel other than UL-CCCH;

MAC CE for the Recommended bit rate query;

BSR MAC CE for padding BSR; and

SL-BSR MAC CE for padding.

In the NTN system, the timing offset Koffset is introduced to enhance the timing of uplink transmission. At the same time, the terminal device may assist the network device (such as, a base station) to configure the value of Koffset by reporting TA.

When the network device configures multiple TA reporting conditions for the terminal device, the behavior of terminal device, i.e., how to trigger and perform TA reporting by the terminal device is required to standardize on the standard level. Therefore, the following technical solutions of the embodiments of the present disclosure are proposed.

It is to be noted that the technical solutions of the embodiments of the present disclosure may be applied, but not limited to, the NR-NTN system and the IoT-NTN system.

In order to facilitate understanding of the technical solutions of the embodiments of the present disclosure, the technical solutions of the present disclosure will be described in detail below through specific embodiments. The above relevant technologies as optional solutions may be arbitrarily combined with the technical solutions of the embodiments of the present disclosure, all of which fall within the scope of protection of the embodiments of the present disclosure. The embodiments of the present disclosure include at least part of the following contents.

Figure 8:
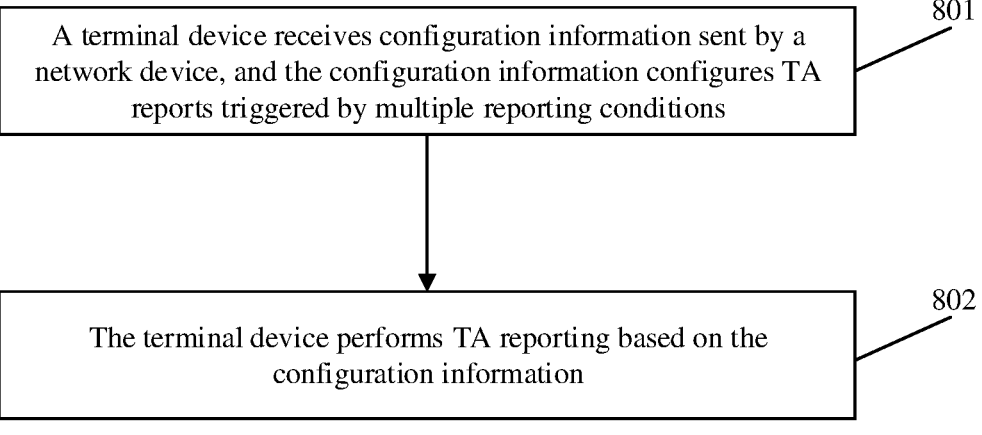
FIG. 8 is a schematic flowchart of a method for reporting timing advance according to an embodiment of the present disclosure.

FIG. 8 is a schematic flowchart of a method for reporting timing advance according to an embodiment of the present disclosure. As illustrated in FIG. 8, the method for reporting timing advance includes the following operations.

In 801, a terminal device receives configuration information sent by a network device. The configuration information configures TA reports triggered by multiple reporting conditions.

The reporting conditions may also be called as "TA reporting conditions".

In some optional implementations, the multiple reporting conditions include a periodic reporting condition and/or at least one event reporting condition.

Here, the periodic reporting condition may also be called as "periodic TA reporting condition". The event reporting condition may also be called as "event TA reporting condition".

As an example, one event reporting condition may be that a variation of a current TA of the terminal device relative to a last reported TA exceeds a certain threshold.

As an example, one event reporting condition may be that the terminal device receives a TA reporting request sent by the network device.

It is to be noted that the types of event reporting conditions are not limited to the above two examples, and there may be other more types of event reporting conditions.

In 802, the terminal device performs TA reporting based on the configuration information.

In the embodiments of the present disclosure, the terminal device performs TA reporting by using MAC CE, where one TA report triggered by one reporting condition corresponds to one logical channel priority. The logical channel priority may be understood with reference to the above related description.

In some optional implementations, logical channel priorities corresponding to the TA reports triggered by the multiple reporting conditions are the same. It is to be understood that TA reports triggered by different reporting conditions correspond to the same logical channel priority.

In one example, the multiple reporting conditions include a first reporting condition and a second reporting condition, and a logical channel priority corresponding to a TA report triggered by the first reporting condition is the same as that corresponding to a TA report triggered by the second reporting condition.

In some optional implementations, logical channel priorities corresponding to the TA reports triggered by the multiple reporting conditions are different. It is to be understood that TA reports triggered by different reporting conditions correspond to different logical channel priorities.

In one example, the multiple reporting conditions include a first reporting condition and a second reporting condition, and a logical channel priority corresponding to a TA report triggered by the first reporting condition is different from that corresponding to a TA report triggered by the second reporting condition.

How the terminal device performs TA reporting will be described below in combination with different situations.

In the first case, TA reports triggered by different reporting conditions correspond to the same logical channel priority.

For the first case, there are two methods for determining how the terminal device performs TA reporting.

Method A1: if the terminal device determines at a first time that the first reporting condition is met, the terminal device triggers a first TA report in a pending state.

Here, the terminal device has at least one TA report in the pending state before the first time; or, the terminal device has no TA report in the pending state before the first time.

Further, in some optional implementations, the terminal device cancels all TA reports that have been triggered and are in the pending state after completing the first TA report.

It is to be noted that for the method A1, different reporting conditions trigger TA reports independently. When the current terminal device meets the first reporting condition, regardless of whether the terminal device currently has one or more TA reports that have been triggered and are in the pending state, the terminal device will trigger another TA report based on the first reporting condition, that is, the first TA report. After the terminal device completes the first TA report, the terminal device cancels all TA reports that have been triggered and are in the pending state.

Method B1: if the terminal device determines at a first time that the first reporting condition is met, the terminal device triggers a first TA report in a pending state, and the terminal device does not trigger a TA report before completing the first TA report.

Further, in some optional implementations, the terminal device cancels all TA reports that have been triggered and are in the pending state after completing the first TA report.

It is to be noted that for the method B1, the terminal device only has at most one triggered TA report at the same time. When the terminal device currently triggers the first TA report and the first TA report is in the pending state, the terminal device no longer evaluates whether to trigger another TA report based on other reporting conditions, or the terminal device no longer triggers another TA report even if other reporting conditions are met. The terminal device cancels the TA reports that have been triggered and are in the pending state after completing the first TA report.

In the second case, TA reports triggered by different reporting conditions correspond to different logical channel priorities.

For the second case, there are two methods for determining how the terminal device performs TA reporting.

Method A2: if the terminal device determines at a first time that the first reporting condition is met, the terminal device triggers a first TA report in a pending state.

Here, the terminal device has at least one TA report in the pending state before the first time; or, the terminal device has no TA report in the pending state before the first time.

Further, in some optional implementations, the terminal device cancels all TA reports that have been triggered and are in the pending state after completing the first TA report.

It is to be noted that for the method A2, different reporting conditions trigger TA reports independently. When the current terminal device meets the first reporting condition, regardless of whether the terminal device currently has one or more TA reports that have been triggered and are in the pending state, the terminal device will trigger another TA report based on the first reporting condition, that is, the first TA report. After the terminal device completes the first TA report, the terminal device cancels all TA reports that have been triggered and are in the pending state.

Method B2: if the terminal device determines at a first time that the first reporting condition is met, and then:

in response to the terminal device having no TA report in a pending state before the first time, the terminal device triggers a first TA report in a pending state; and in response to the terminal device having at least one TA report in the pending state before the first time, the terminal device determines whether to trigger the first TA report based on the logical channel priority corresponding to the TA report triggered by the first reporting condition and logical channel priorities of the at least one TA report.

Specifically, the terminal device determines to trigger the first TA report when the logical channel priority corresponding to the TA report triggered by the first reporting condition is higher than logical channel priorities of all TA reports in the at least one TA report; and the terminal device determines not to trigger the first TA report when the logical channel priority corresponding to the TA report triggered by the first reporting condition is lower than logical channel priorities of at least part of TA reports in the at least one TA report.

In the third case, the terminal device does not trigger a TA report in a first duration after a first time if the terminal device completes the first TA report at the first time.

In some optional implementations, the first duration is configured by at least one of: a broadcast message, RRC signaling, MAC CE or a PDCCH.

The technical solutions of the embodiments of the present disclosure are described in combination with specific application instances.

First Application Instance

A terminal device performs TA reporting by using MAC CE, and TA reports triggered by different reporting conditions correspond to the same logical channel priority. The specific implementation process is described as follows.

Operation 1: the terminal device receives configuration information sent by a network device, and the configuration information configures TA reports triggered by multiple reporting conditions.

For example, the TA reports triggered by the multiple reporting conditions include at least one of: a TA report triggered by a periodic reporting condition or a TA report triggered by at least one event reporting condition.

Here, the TA reports triggered by different reporting conditions correspond to the same logical channel priority.

Operation 2: the method for the terminal device to trigger the TA reports may be as follows.

Method A1

Taking the first reporting condition as a periodic reporting condition and the second reporting condition as an event reporting condition as an example, the periodic reporting condition and the event reporting condition correspond to the same logical channel priority. The periodic reporting condition and the event reporting condition trigger TA reports independently.

Specifically, if the terminal device currently meets the periodic reporting condition, regardless of whether the terminal device currently has one or more TA reports that have been triggered and are in the pending state (for example, the terminal device has triggered a TA report triggered based on the event reporting condition before the current time, and the TA report is still in a resource waiting state), the terminal device will trigger another TA report based on the periodic reporting condition. The terminal device cancels all TA reports that have been triggered and are in the pending state after completing the TA report.

Figure 9A:
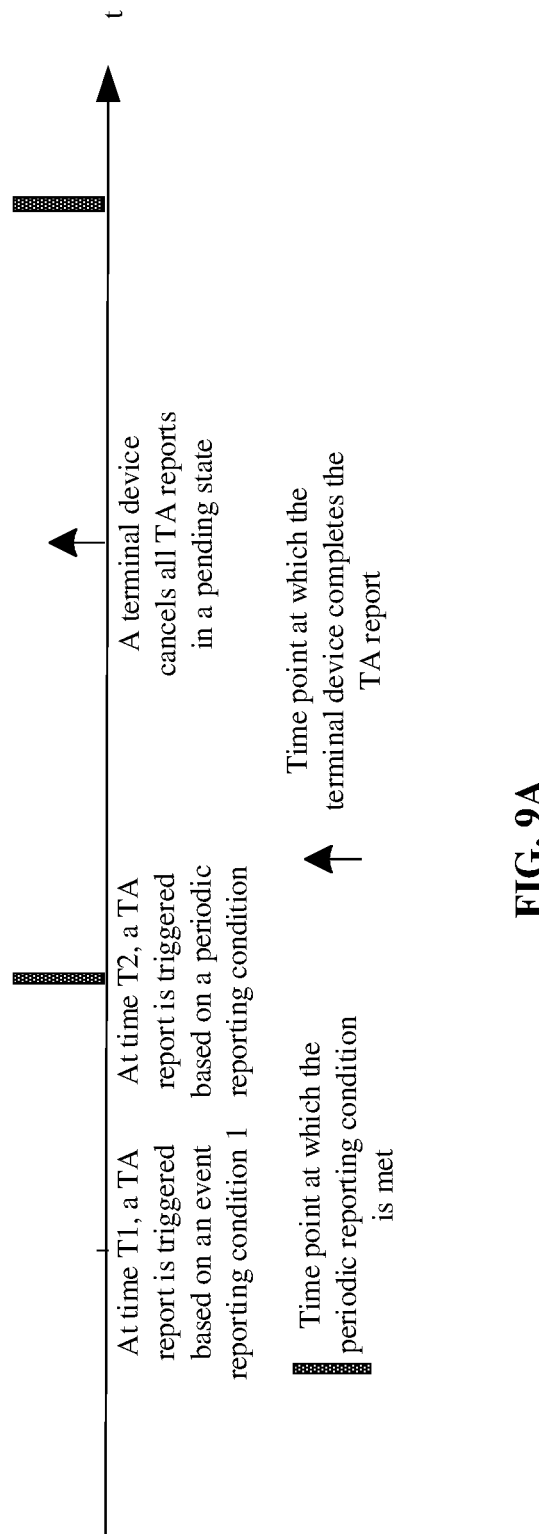
FIG. 9A is a first example diagram of TA reporting according to an embodiment of the present disclosure.

Referring to FIG. 9A, at time T1, the terminal device triggers a TA report based on the event reporting condition 1; at time T2, the terminal device triggers a TA report based on the periodic reporting condition; after the time T2, the terminal device completes one TA report (for example, the TA report triggered by the periodic reporting condition is completed), and then the terminal device cancels all TA reports in the pending state.

Method B1

Taking the first reporting condition as an event reporting condition and the second reporting condition as a periodic reporting condition as an example, the periodic reporting condition and the event reporting condition correspond to the same logical channel priority. For the periodic reporting condition and the event reporting condition, there is at most one triggered TA report at the same time.

Specifically, if the terminal device has currently triggered a TA report based on the event reporting condition and the TA report is in the pending state (for example, the terminal device has triggered an event triggering-based TA report before the current time, and the TA report is still in the resource waiting state), the terminal device no long evaluates whether to trigger another TA report based on other reporting conditions (such as, the periodic reporting condition), or the terminal device no longer triggers another TA report even if other reporting conditions (such as, the periodic reporting condition) are met. The terminal device cancels all TA reports that have been triggered and are in the pending state after completing the TA report.

Figure 9B:
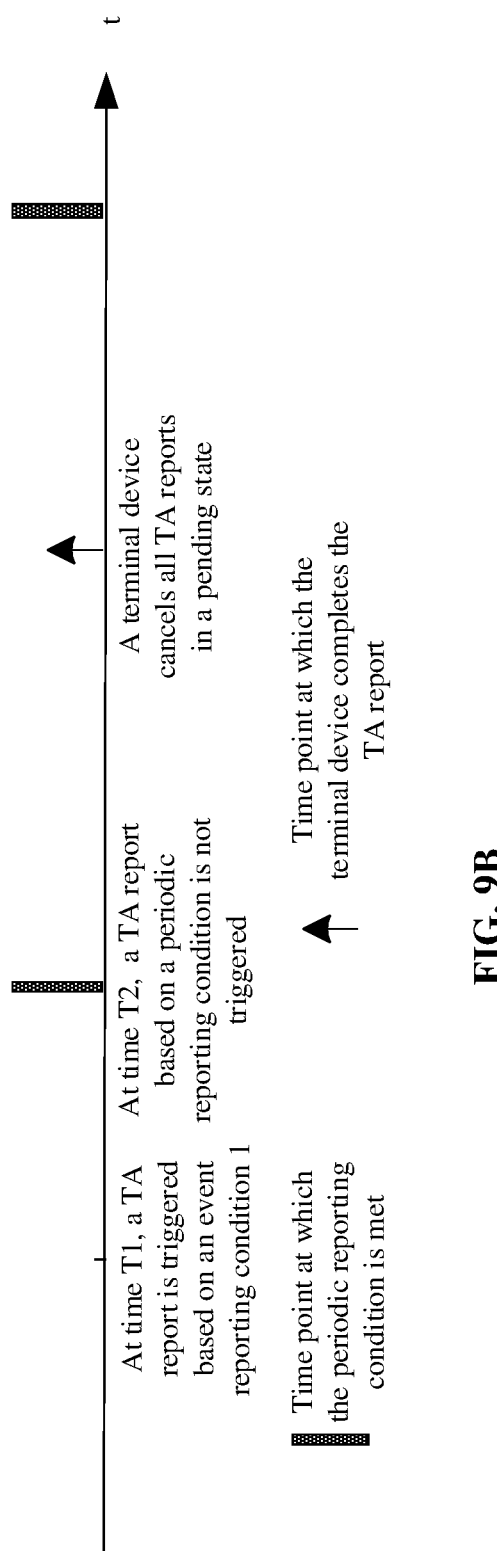
FIG. 9B is a second example diagram of TA reporting according to an embodiment of the present disclosure.

Referring to FIG. 9B, at time T1, the terminal device triggers a TA report based on the event reporting condition 1; at time T2, the terminal device skips triggering of a TA report based on the periodic reporting condition; after the time T2, the terminal device completes one TA report (for example, the TA report triggered by the event report condition is completed), and then the terminal device cancels all TA reports in the pending state.

Second Application Instance

A terminal device performs TA reporting by using MAC CE, and the TA reports triggered by different reporting conditions correspond to different logical channel priorities. The specific implementation process is described as follows.

Operation 1: the terminal device receives configuration information sent by a network device, and the configuration information configures TA reports triggered by multiple reporting conditions.

For example, the TA reports triggered by the multiple reporting conditions include at least one of: a TA report triggered by a periodic reporting condition, or a TA report triggered by at least one event reporting condition.

Here, the TA reports triggered by different reporting conditions correspond to different logical channel priorities.

For example, a TA report triggered based on the periodic reporting condition and a TA report triggered based on the event reporting condition correspond to different logical channel priorities. In one example, the logical channel priority of the TA report triggered based on the periodic reporting condition is lower than that of the TA report triggered based on the event reporting condition.

For example, a TA report triggered based on an event reporting condition 1 and a TA report triggered based on an event reporting condition 2 correspond to different logical channel priorities. In one example, the logical channel priority of the TA report triggered based on the event reporting condition 1 is lower than that of the TA report triggered based on the event reporting condition 2.

Operation 2: the method for the terminal device to trigger the TA reports may be as follows.

Method A2

Taking the first reporting condition as a periodic reporting condition and the second reporting condition as an event reporting condition as an example, the periodic reporting condition and the event reporting condition correspond to different logical channel priorities. The periodic reporting condition and the event reporting condition trigger TA reports independently.

Specifically, if the terminal device currently meets the periodic reporting condition, regardless of whether the terminal device currently has one or more TA reports that have been triggered and are in the pending state (for example, the terminal device has triggered a TA report triggered based on the event reporting condition before the current time, and the TA report is still in a resource waiting state), the terminal device will trigger another TA report based on the periodic reporting condition. The terminal device cancels all TA reports that have been triggered and are in the pending state after completing the TA report.

Referring to FIG. 9A, at time T1, the terminal device triggers a TA report based on the event reporting condition 1; at time T2, the terminal device triggers a TA report based on the periodic reporting condition; after the T2 time, the terminal device completes one TA report (for example, the TA report triggered by the periodic reporting condition is completed), and then the terminal device cancels all TA reports in the pending state.

Method B2

Specifically, if the terminal device currently meets the first reporting condition:
a) when the terminal device has no TA report in the pending state at present, the terminal device triggers a TA report based on the first reporting condition; and
b) when the terminal device has currently triggered at least one TA report and the at least one TA report is in the pending state, and the logical channel priority of the TA report triggered by the first reporting condition is higher than all logical channel priorities of the at least one TA report, the terminal device triggers a TA report based on the first reporting condition. Otherwise, the terminal device does not trigger a TA report.

The terminal device cancels all TA reports that have been triggered and are in the pending state after completing the TA report.

Figure 9C:
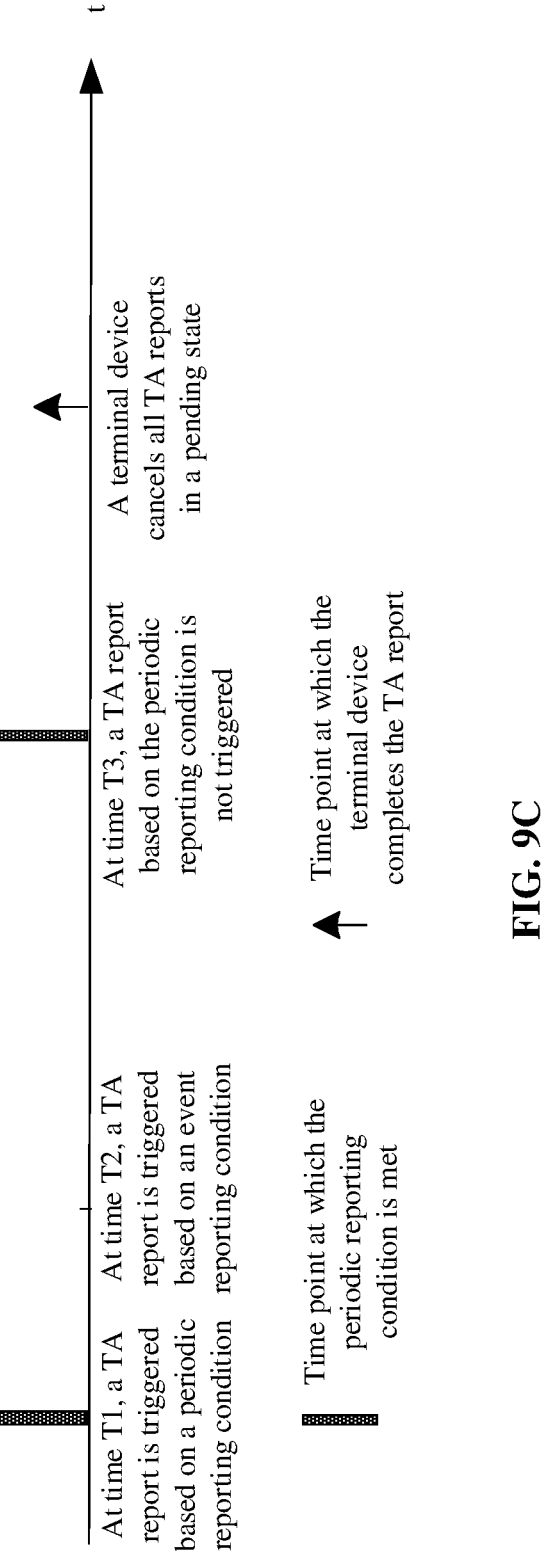
FIG. 9C is a third example diagram of TA reporting according to an embodiment of the present disclosure.

Referring to FIG. 9C, it is assumed that the logical channel priority of the TA report triggered by the event reporting condition is higher than that of the TA report triggered by the periodic reporting condition. At time T1, the terminal device triggers a TA report based on the periodic reporting condition; the terminal device meets the event reporting condition at time T2 and triggers a TA report based on the event reporting condition; at time T3, the terminal device does not trigger a TA report based on the periodic reporting condition; after time T3, the terminal device completes one TA report (for example, the TA report triggered by the event reporting condition is completed), and then the terminal device cancels all TA reports in the pending state.

Third Application Instance

The specific implementation process is described as follows.

Operation 1: a terminal device receives configuration information sent by a network device, and the configuration information configures TA reports triggered by multiple reporting conditions.

For example, the TA reports triggered by the multiple reporting conditions include at least one of: a TA report triggered by a periodic reporting condition, or a TA report triggered by at least one event reporting condition.

Operation 2: the method for the terminal device to trigger the TA reports may be described as follows.

The terminal device no longer triggers a TA report for a period of time after completing one TA report. In some optional implementations, the terminal device no longer triggers a TA report based on the periodic trigger condition for a period of time after completing one TA report.

Figure 9D:
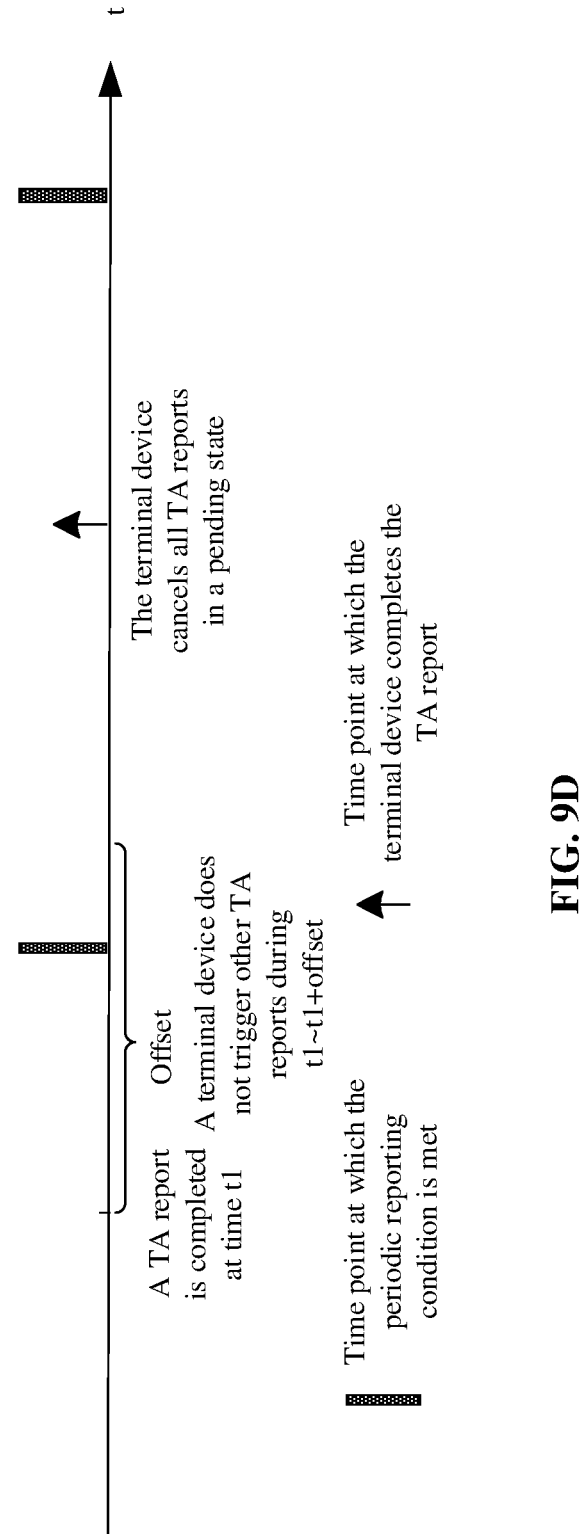
FIG. 9D is a fourth example diagram of TA reporting according to an embodiment of the present disclosure.

Referring to FIG. 9D, the terminal device completes a TA report at time t1, and the terminal device does not trigger other TA reports during t1~t1+offset, for example, a TA report based on the periodic reporting condition is not triggered. In one example, the value of the offset is configured by the network through a broadcast message or RRC signaling or MAC CE or PDCCH.

The technical solutions of the embodiments of the present disclosure provide a method for reporting TA, which is applied to the terminal device in the NTN system and solves the problems of how to trigger TA reports and determine the logical channel priorities of the TA reports by the terminal device under the condition that the network device configures multiple types of reporting conditions for the terminal device. The technical solutions of the embodiments of the present disclosure enable the terminal device to provide effective reference for network scheduling through the TA reports, while taking into account the logical channel priority processing between services and MAC CE.

Figure 10:
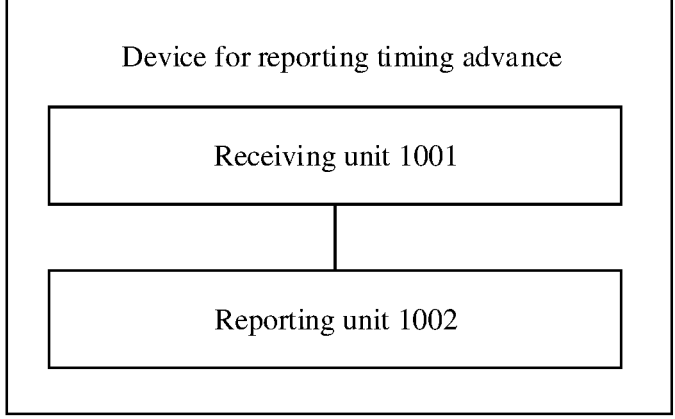
FIG. 10 is a schematic diagram of structure and composition of a device for reporting timing advance according to an embodiment of the present disclosure.

FIG. 10 is a schematic diagram of structure and composition of a device for reporting TA according to an embodiment of the present disclosure, which is applicable to a terminal device. As illustrated in FIG. 10, the device for reporting TA includes a receiving unit 1001 and a reporting unit 1002.

The receiving unit 1001 is configured to receive configuration information sent by a network device. The configuration information configures TA reports triggered by multiple reporting conditions.

The reporting unit 1002 is configured to perform TA reporting based on the configuration information.

In some optional implementations, logical channel priorities corresponding to the TA reports triggered by the multiple reporting conditions are the same.

In some optional implementations, the multiple reporting conditions include a first reporting condition and a second reporting condition, and a logical channel priority corresponding to a TA report triggered by the first reporting condition is the same as that corresponding to a TA report triggered by the second reporting condition.

In some optional implementations, logical channel priorities corresponding to the TA reports triggered by the multiple reporting conditions are different.

In some optional implementations, the multiple reporting conditions include a first reporting condition and a second reporting condition, and a logical channel priority corresponding to a TA report triggered by the first reporting condition is different from that corresponding to a TA report triggered by the second reporting condition.

In some optional implementations, the reporting unit 1002 is configured to trigger a first TA report in a pending state in response to determining at a first time that the first reporting condition is met.

In some optional implementations, the terminal device has at least one TA report in the pending state before the first time; or, the terminal device has no TA report in the pending state before the first time.

In some optional implementations, the reporting unit 1002 is configured to trigger a first TA report in a pending state in response to determining at a first time that the first reporting condition is met, and not trigger a TA report before the first TA report is completed.

In some optional implementations, the reporting unit 1002 is configured to, in response to determining at a first time that the first reporting condition is met, trigger a first TA report in a pending state in response to having no TA report in a pending state before the first time; and determine whether to trigger the first TA report based on the logical channel priority corresponding to the TA report triggered by the first reporting condition and logical channel priorities of at least one TA report in response to having the at least one TA report in the pending state before the first time.

In some optional implementations, the reporting unit 1002 is configured to determine to trigger the first TA report in response to the logical channel priority corresponding to the TA report triggered by the first reporting condition being higher than logical channel priorities of all TA reports in the at least one TA report, and determine not to trigger the first TA report in response to the logical channel priority corresponding to the TA report triggered by the first reporting condition being lower than logical channel priorities of at least part of TA reports in the at least one TA report.

In some optional implementations, the reporting unit 1002 is configured to, in response to a first TA report being completed at a first time, not trigger a TA report in a first duration after the first time.

In some optional implementations, the first duration is configured by at least one of: a broadcast message, RRC signaling, MAC CE or a PDCCH.

In some optional implementations, the device also includes a cancelling unit.

The cancelling unit is configured to cancel all TA reports that have been triggered and are in the pending state after the reporting unit completes the first TA report.

In some optional implementations, the multiple reporting conditions include at least one of a periodic reporting condition or at least one event reporting condition.

It is to be understood by those skilled in the art that the description of the device for reporting TA described above in the embodiments of the present disclosure may be understood with reference to the description of the method for reporting TA in the embodiments of the present disclosure.

Figure 11:
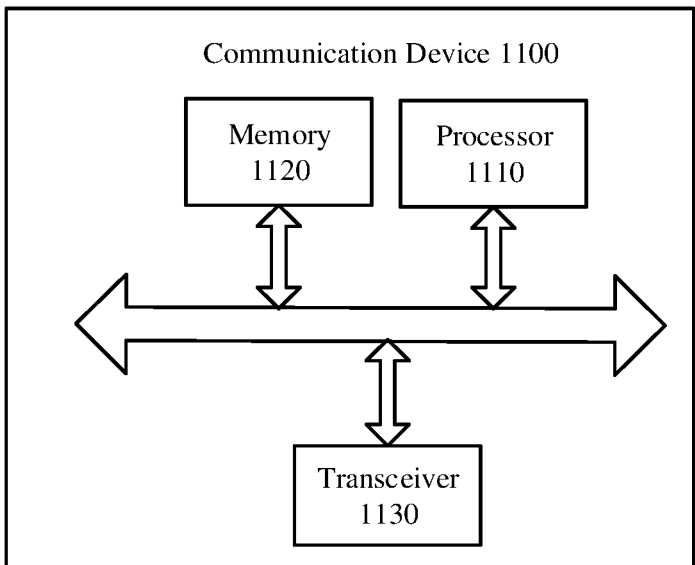
FIG. 11 is a schematic structural diagram of a communication device according to an embodiment of the present disclosure.

FIG. 11 is a schematic structural diagram of a communication device 1100 according to an embodiment of the present disclosure. The communication device may be a terminal device or a network device. The communication device 1100 illustrated in FIG. 11 includes a processor 1110. The processor 1110 may call a computer program from a memory and run the computer program to perform the method in the embodiments of the present disclosure.

In one example, as illustrated in FIG. 11, the communication device 1100 may also include a memory 1120. The processor 1110 may call a computer program from the memory 1120 and run the computer program to perform the method in the embodiments of the present disclosure.

The memory 1120 may be a separate device from the processor 1110, or may be integrated into the processor 1110.

In one example, as illustrated in FIG. 11, the communication device 1100 may also include a transceiver 1130. The processor 1110 may control the transceiver 1130 to communicate with another device, specifically, to transmit information or data to another device, or receive information or data from another device.

The transceiver 1130 may include a transmitter and a receiver. The transceiver 1330 may further include one or more antennas.

In one example, the communication device 1100 may specifically be the network device in the embodiments of the present disclosure. The communication device 1100 may implement a corresponding process implemented by the network device in each method of the embodiments of the present disclosure, which will not be elaborated herein for brief description.

In one example, the communication device 1100 may specifically be the mobile terminal/terminal device in the embodiments of the present disclosure. The communication device 1100 may implement a corresponding process implemented by the mobile terminal/terminal device in each method of the embodiments of the disclosure, which will not be elaborated herein for brief description.

Figure 12:
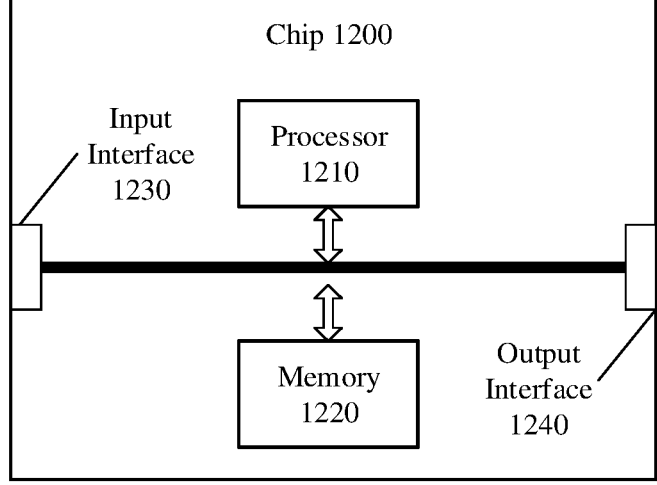
FIG. 12 is a schematic structural diagram of a chip according to an embodiment of the present disclosure.

FIG. 12 is a schematic structural diagram of a chip according to an embodiment of the present disclosure. The chip 1200 illustrated in FIG. 12 includes a processor 1210. The processor 1210 may call a computer program from a memory and run the computer program to perform the method in the embodiments of the present disclosure.

In one example, as illustrated in FIG. 12, the chip 1200 may also include a memory 1220. The processor 1210 may call a computer program from the memory 1220 and run the computer program to perform the method in the embodiments of the present disclosure.

The memory 1220 may be a separate device from the processor 1210, or may be integrated in the processor 1210.

In one example, the chip 1200 may also include an input interface 1230. The processor 1210 may control the input interface 1230 to communicate with another device or chip, and specifically, may acquire information or data transmitted by another device or chip.

In one example, the chip 1200 may also include an output interface 1240. The processor 1210 may control the output interface 1240 to communicate with another device or chip, and specifically, may output information or data to another device or chip.

In one example, the chip may be applied to the network device in the embodiments of the present disclosure. The chip may implement a corresponding process implemented by the network device in each method of the embodiments of the disclosure, which will not be elaborated herein for brief description.

In one example, the chip may be applied to the mobile terminal/terminal device in the embodiments of the present disclosure. The chip may implement a corresponding process implemented by the mobile terminal/terminal device in each method of the embodiments of the disclosure, which will not be elaborated herein for brief description.

It is to be understood that in the embodiments of the disclosure, the chip may also be referred to as a system level chip, a system chip, a chip system or a system-on-chip.

Figure 13:
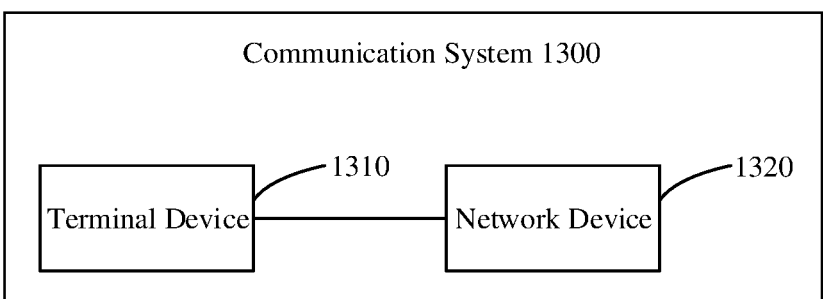
FIG. 13 is a schematic block diagram of a communication system according to an embodiment of the present disclosure.

FIG. 13 is a schematic block diagram of a communication system 1300 according to an embodiment of the present disclosure. As illustrated in FIG. 13, the communication system 1300 includes a terminal device 1310 and a network device 1320.

The terminal device 1310 may implement the corresponding functions implemented by the terminal device in the above methods, and the network device 1320 may implement the corresponding functions implemented by the network device in the above methods. Details will not be elaborated herein for brief description.

It is to be understood that in the embodiments of the disclosure, the processor may be an integrated circuit chip with a signal processing capability. In an implementation process, each operation of the method embodiments may be completed by an integrated logical circuit of hardware in the processor or instructions in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, step and logical block diagram disclosed in the embodiments of the disclosure may be implemented or executed. The universal processor may be a microprocessor or the processor may also be any related processor and the like. The operations of the methods disclosed in combination with the embodiments of the disclosure may be directly embodied to be executed and completed by a hardware decoding processor, or executed and completed by a combination of hardware and software modules in the decoding processor. The software module may be located in a mature storage medium in the art, such as a Random Access Memory (RAM), a flash memory, a Read-Only Memory (ROM), a Programmable ROM (PROM), an Electrically Erasable PROM (EEPROM) or a register. The storage medium is located in the memory. The processor reads information in the memory, and completes the operations of the above methods in combination with hardware of the processor.

It is to be understood that the memory in the embodiment of the disclosure may be a volatile memory or a non-volatile memory, or may include the volatile memory and the non-volatile memory. The non-volatile memory may be an ROM, a PROM, an Erasable PROM (EPROM), an EEPROM or a flash memory. The volatile memory may be an RAM and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It is to be noted that the memory of the system and the method described in the disclosure is intended to include but not limited to memories of these and any other suitable type.

It is to be understood that the above memory is exemplarily but unlimitedly described. For example, the memory in the embodiments of the disclosure may also be an SRAM, a DRAM, an SDRAM, a DDR SDRAM, an ESDRAM, an SLDRAM and a DR RAM. That is, the memory in the embodiments of the disclosure is intended to include but not limited to memories of these and any other suitable type.

The embodiments of the disclosure also provide a computer-readable storage medium for storing one or more computer programs.

In one example, the computer-readable storage medium may be applied in the network device of the embodiments of the disclosure. The computer programs may enable a computer to perform the corresponding process implemented by the network device in each method of the embodiments of the disclosure, which will not be elaborated herein for brief description.

In one example, the computer-readable storage medium may be applied in the mobile terminal/terminal device of the embodiments of the disclosure. The computer programs may enable a computer to perform the corresponding process implemented by the mobile terminal/terminal device in each method of the embodiments of the disclosure, which will not be elaborated herein for brief description.

The embodiments of the disclosure also provide a computer program product. The computer program product includes one or more computer program instructions.

In one example, the computer program product may be applied in the network device of the embodiments of the disclosure. The computer program instructions may enable a computer to perform the corresponding process implemented by the network device in each method of the embodiments of the disclosure, which will not be elaborated herein for brief description.

In one example, the computer program product may be applied in the mobile terminal/terminal device of the embodiments of the disclosure. The computer program instructions may enable a computer to perform the corresponding process implemented by the mobile terminal/terminal device in each method of the embodiments of the disclosure, which will not be elaborated herein for brief description.

The embodiments of the disclosure also provide a computer program.

In one example, the computer program may be applied in the network device of the embodiments of the disclosure. The computer program, when executed by a computer, enables the computer to perform the corresponding process implemented by the network device in each method of the embodiments of the disclosure, which will not be elaborated herein for brief description.

In one example, the computer program may be applied in the mobile terminal/terminal device of the embodiments of the disclosure. The computer program, when executed by a computer, enables the computer to perform the corresponding process implemented by the mobile terminal/terminal device in each method of the embodiments of the disclosure, which will not be elaborated herein for brief description.

Those of ordinary skill in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiments and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between displayed or discussed components may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the disclosure may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for reporting timing advance (TA), comprising:

receiving, by a terminal device, configuration information sent by a network device, the configuration information configuring TA reports triggered by a plurality of reporting conditions; and performing, by the terminal device, TA reporting based on the configuration information;

wherein the plurality of reporting conditions comprise a first reporting condition and a second reporting condition, when logical channel priorities corresponding to the TA reports triggered by the plurality of reporting conditions are the same, a logical channel priority corresponding to a TA report triggered by the first reporting condition is the same as that corresponding to a TA report triggered by the second reporting condition; or, when logical channel priorities corresponding to the TA reports triggered by the plurality of reporting conditions are different, a logical channel priority corresponding to a TA report triggered by the first reporting condition is different from that corresponding to a TA report triggered by the second reporting condition.

2. The method of claim 1, wherein performing, by the terminal device, TA reporting based on the configuration information comprises:

triggering, by the terminal device in response to determining at a first time that the first reporting condition is met, a first TA report in a pending state.

3. The method of claim 2, wherein the terminal device has at least one TA report in the pending state before the first time; or the terminal device has no TA report in the pending state before the first time.

4. The method of claim 2, wherein performing, by the terminal device, TA reporting based on the configuration information further comprises:

cancelling, by the terminal device after completing the first TA report, all TA reports that have been triggered and are in the pending state.

5. The method of claim 1, wherein performing, by the terminal device, TA reporting based on the configuration information comprises:

triggering, by the terminal device in response to determining at a first time that the first reporting condition is met, a first TA report in a pending state; and triggering, by the terminal device, no TA report before completing the first TA report.

6. The method of claim 1, wherein performing, by the terminal device, TA reporting based on the configuration information comprises: in response to determining at a first time that the first reporting condition is met, in response to the terminal device having no TA report in a pending state before the first time, triggering, by the terminal device, a first TA report in the pending state; and in response to the terminal device having at least one TA report in the pending state before the first time, determining, by the terminal device, whether to trigger the first TA report based on the logical channel priority corresponding to the TA report triggered by the first reporting condition and logical channel priorities of the at least one TA report.

7. The method of claim 6, wherein determining, by the terminal device, whether to trigger the first TA report based on the logical channel priority corresponding to the TA report triggered by the first reporting condition and the logical channel priorities of the at least one TA report comprises:

determining, by the terminal device, to trigger the first TA report in response to the logical channel priority corresponding to the TA report triggered by the first reporting condition being higher than logical channel priorities of all TA reports in the at least one TA report; and determining, by the terminal device, not to trigger the first TA report in response to the logical channel priority corresponding to the TA report triggered by the first reporting condition being lower than logical channel priorities of at least part of TA reports in the at least one TA report.

8. The method of claim 1, wherein performing, by the terminal device, TA reporting based on the configuration information comprises:

triggering, by the terminal device in response to the terminal device completing a first TA report at a first time, no TA report in a first duration after the first time.

9. The method of claim 1, wherein the plurality of reporting conditions comprise at least one of a periodic reporting condition or at least one event reporting condition.

10. A device for reporting timing advance (TA), applicable to a terminal device and comprising:

a transceiver, configured to receive configuration information sent by a network device, the configuration information configuring TA reports triggered by a plurality of reporting conditions; and a processor, configured to perform TA reporting based on the configuration information;

wherein the plurality of reporting conditions comprise a first reporting condition and a second reporting condition, when logical channel priorities corresponding to the TA reports triggered by the plurality of reporting conditions are the same, a logical channel priority corresponding to a TA report triggered by the first reporting condition is the same as that corresponding to a TA report triggered by the second reporting condition; or, when logical channel priorities corresponding to the TA reports triggered by the plurality of reporting conditions are different, a logical channel priority corresponding to a TA report triggered by the first reporting condition is different from that corresponding to a TA report triggered by the second reporting condition.

11. The device of claim 10, wherein the processor is configured to trigger a first TA report in a pending state in response to determining at a first time that the first reporting condition is met.

12. The device of claim 10, wherein the processor is configured to trigger a first TA report in a pending state in response to determining at a first time that the first reporting condition is met, and trigger no TA report before completing the first TA report.

13. The device of claim 10, wherein the processor is configured to, in response to determining at a first time that the first reporting condition is met, trigger a first TA report in a pending state in response to having no TA report in the pending state before the first time; and determine, in response to having at least one TA report in the pending state before the first time, whether to trigger the first TA report based on the logical channel priority corresponding to the TA report triggered by the first reporting condition and logical channel priorities of the at least one TA report.

14. The device of claim 10, wherein the processor is configured to, in response to completing a first TA report at a first time, trigger no TA report in a first duration after the first time.

15. The device of claim 11, wherein the processor is configured to cancel all TA reports that have been triggered and are in the pending state after the first TA report is completed.

16. A non-transitory computer readable storage medium, configured to store a computer program that causes a computer to execute a method for reporting timing advance (TA), comprising:

receiving configuration information sent by a network device, the configuration information configuring TA reports triggered by a plurality of reporting conditions; and performing TA reporting based on the configuration information;

wherein the plurality of reporting conditions comprise a first reporting condition and a second reporting condition, when logical channel priorities corresponding to the TA reports triggered by the plurality of reporting conditions are the same, a logical channel priority corresponding to a TA report triggered by the first reporting condition is the same as that corresponding to a TA report triggered by the second reporting condition; or, when logical channel priorities corresponding to the TA reports triggered by the plurality of reporting conditions are different, a logical channel priority corresponding to a TA report triggered by the first reporting condition is different from that corresponding to a TA report triggered by the second reporting condition.

\* \* \* \* \*